Jan. 13, 1959   E. M. WILLIAMS ET AL   2,868,947
SPARK MACHINING APPARATUS
Filed April 20, 1956   5 Sheets-Sheet 1

INVENTORS.
Everard M. Williams
Cecil Paul Porterfield
By: Carlson, Pitzner, Hubbard & Wolfe
Attys.

Jan. 13, 1959 E. M. WILLIAMS ET AL 2,868,947
SPARK MACHINING APPARATUS
Filed April 20, 1956

INVENTORS.
Everard M. Williams
Cecil Paul Porterfield
By Carlson, Pitzner, Hubbard & Wolfe
Attys.

Jan. 13, 1959     E. M. WILLIAMS ET AL     2,868,947
SPARK MACHINING APPARATUS Filed April 20, 1956                       5 Sheets-Sheet 5

INVENTORS.
Everard M Williams
Cecil Paul Porterfield
By: Carlson, Pitzner, Hubbard & Wolfe
Attys.

United States Patent Office 2,868,947
Patented Jan. 13, 1959

2,868,947

SPARK MACHINING APPARATUS

Everard M. Williams and Cecil Paul Porterfield, Pittsburgh, Pa., assignors to Firth Stirling Inc., Pittsburgh, Pa., a corporation of Pennsylvania Application April 20, 1956, Serial No. 579,623

2 Claims. (Cl. 219—69)

The present invention relates to the art of spark machining, often referred to as electro-erosion, in which particles of the material of a conductive workpiece are dislodged therefrom by overvoltage-initiated time-spaced spark discharges through a dielectric medium in a spark gap defined between an electrode-tool and the conductive workpiece.

This art finds particular utility in the machining of extremely hard materials such as tungsten carbide and hard alloy steels, and indeed all conducting materials, because in the practice of this art a tool can be used which can be fashioned from relatively soft, easily worked, inexpensive material since the tool does not need to physically engage the work during operation thereon. A dielectric is maintained in the spark gap between the tool, or electrode, and the work and is necessary to obtain the repeated, short, high-current spark discharges which have been found effective for the attainment of practical machining rates and to avoid discharges of insufficient current density as might occur in air. The dielectric is necessarily capable of being ruptured in the presence of an overvoltage and in addition is capable of returning to its original state when the voltage is removed. Further the dielectric serves to entrain particles removed from the work and assists in removing the same from the immediate vicinity of the spark gap.

The primary object of the present invention lies in the provision of an improved electrode-tool for use in an "external" or outside spark machining operation.

A related object is to provide an improved wheel type electrode-tool for use in spark machining devices intended primarily for performing sharpening, dressing, and allied operations and more particularly to improve the dielectric retaining and distributing characteristics of such an electrode-tool, and further, to provide improved means for incorporating the same in a spark machining circuit.

The objects of the invention thus generally set forth together with other objects and ancillary advantages are attained by the construction and arrangement shown by way of illustration in the accompanying drawings, in which.

While the invention is susceptible of various modifications and alternative constructions there is shown in the drawings and will herein be described in detail certain preferred embodiments. It will be understood, however, that it is not intended to limit the invention peculiarly to such embodiments. On the contrary, it is intended to cover all modifications and alternative constructions falling within the spirit and scope of the invention as expressed in the appended claims.

In spark-machining the cutting or eroding action is provided by the spark-over discharge in a spark gap defined between the closely spaced juxtaposed surfaces of a workpiece and an electrode-tool. The tool does not need to contact the workpiece nor does its own hardness affect the machining operation. The spark discharges are of very short duration and of relatively high energy content, the discharge energy being usually provided by capacitive storage means coupled across the spark gap. The spark-over discharges take place through a fluid or semi-solid medium having dielectric properties which at all times fill the gap. During application of the spark discharges, minute particles of the workpiece are successively dislodged therefrom in the region opposite the electrode-tool to generate the machined contour desired for the workpiece. As the machining action progresses it is generally necessary to maintain the spacing between the workpiece and the electrode-tool substantially constant. In many instances a feed mechanism and control assembly are provided which may desirably take the form of an electrical servo-mechanism for maintaining the desired spacing and to avoid either closing the gap and short circuiting the electrodes or increasing the gap space so far that no over-voltage initiated discharge can occur. For many purposes, however, it is desirable that the workpiece be more freely movable with respect to the electrode-tool, preferably by manipulation of the workpiece itself. It is also desirable for some operations that the spark gap spacing be controlled with feed pressure applied manually or by simple mechanical means. Such a situation exists in performing a spark machining operation for the shaping and dressing of tools, bits and cutters.

The present invention is shown and described in a form intended for incorporation in a machine for effecting a "grinding" operation. With such machines the workpiece, as noted above, may frequently comprise a conventional single point tool and the operation to be performed thereon may include both shaping the tip to a predetermined contour and then sharpening it.

In the illustrative spark machining apparatus there is provided means for the removal of the material of a workpiece at a relatively high rate, as would be desired in shaping a cutting tool and also for the removal of the material of the workpiece at a relatively lower rate as would be desired in dressing or sharpening a cutting tool. Thus, the illustrative machine incorporates means for effecting relatively high energy, overvoltage initiated, time-spaced spark discharges at a relatively low repetition rate and complementary addition means for effecting relatively low energy, overvoltage initiated, time-spaced spark-discharges at a relatively higher rate, these means each including a capacitive storage component continuously connected to an alternating current source, together with means for alternatively completing the discharge of the capacitive storage components across the gap maintained between the workpiece and the electrode-tool according to the desired metal removal rate.

The spark machining circuitry as thus generally described will be discussed somewhat more fully hereinafter. However, for a full and complete description thereof reference is made to applicants' copending application Serial No. 643,691, filed March 11, 1957, as a division and a continuation-in-part of the present application.

Referring more particularly to the drawings, there shown is a machine, generally designated 20, of the type generally referred to as an off-hand tool sharpener. As shown, it includes a base 22 mounting a spark machining unit 24. The unit includes a work-supporting table 25 and an electrode-tool in the form of a wheel 26. The table 25 is adapted for transverse angular adjustment with respect to the wheel 26 and for bodily movement toward and away from the wheel. For these purposes the table is mounted on a supporting structure or saddle 28 which includes an angle adjusting screw 29 and a translating screw 30. Adjacent its rear edge the table 25 is provided with a pair of depending lugs 31 for the reception of pivot pins 31a, the latter being supported in alined openings formed in upstanding brackets 28a which are rigid with the saddle 28. The pivot pins define an axis about which the table can be angularly adjusted, which axis is horizontally disposed in parallel relation to the plane of the face of the electrode-wheel. Depending from the forward edge of the table are a pair of lugs 32 between which is pivotally supported a centrally apertured collar 33 through which the angle adjusting screw 29 extends. The lower end of the angle adjusting screw 29 is received in a nut 34 supported by brackets 35, which in turn are rigid with the saddle 28. It will be apparent that rotation of the screw 29 results in raising or lowering the forward edge of the table 25 so as to alter the angular position of the table about the axis defined by the pins 31a and with respect to the electrode-wheel 26.

Figures 1, 1A, 7, 8:
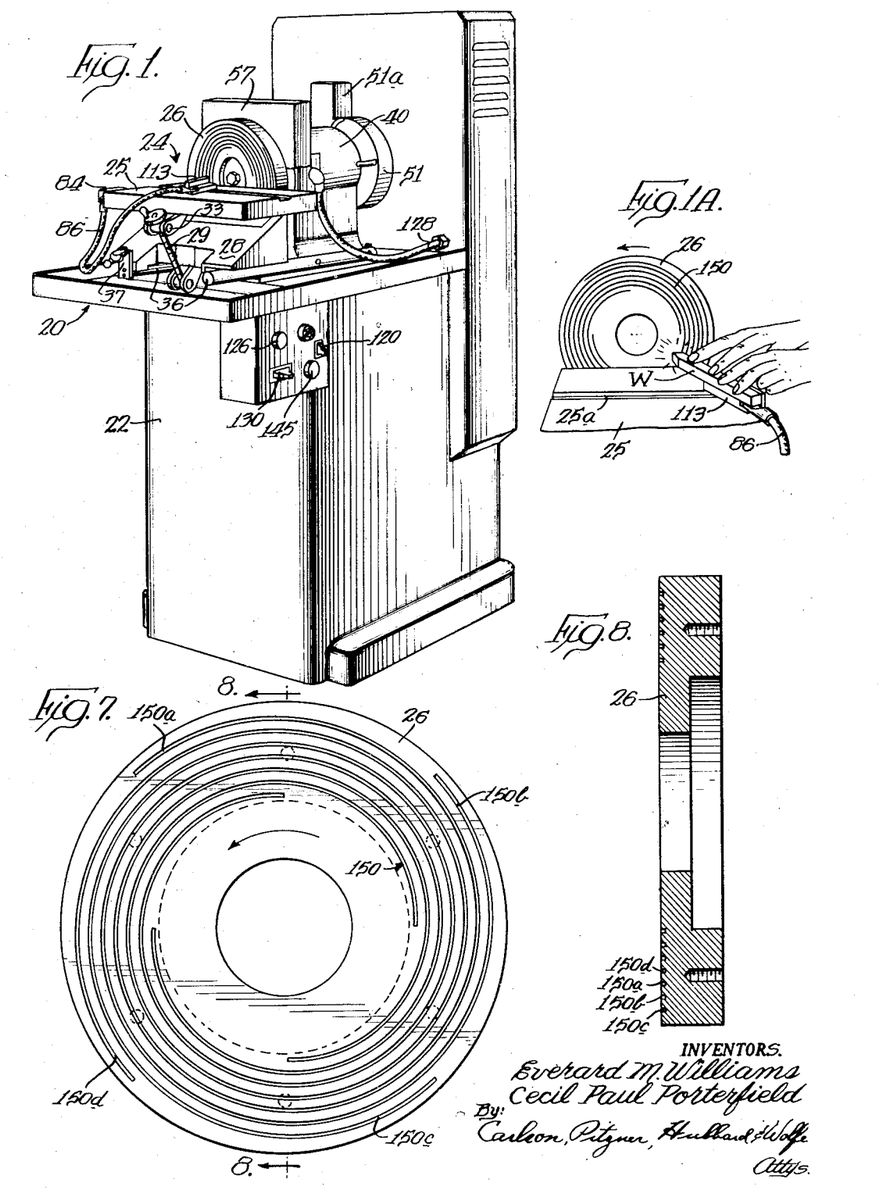
Figure 1 is a perspective view of a machine embodying the present invention for performing an external spark machining operation.
Fig. 1A is a fragmentary front perspective view of the electrode-wheel and work table and showing a workpiece in operative position thereon.
Fig. 7 is a front elevation of an improved electrode-tool in the form of a wheel as included in the machine illustrated in the preceding figures.
Fig. 8 is a section taken substantially in the plane of line 8—8 in Fig. 7.
Figure 2:
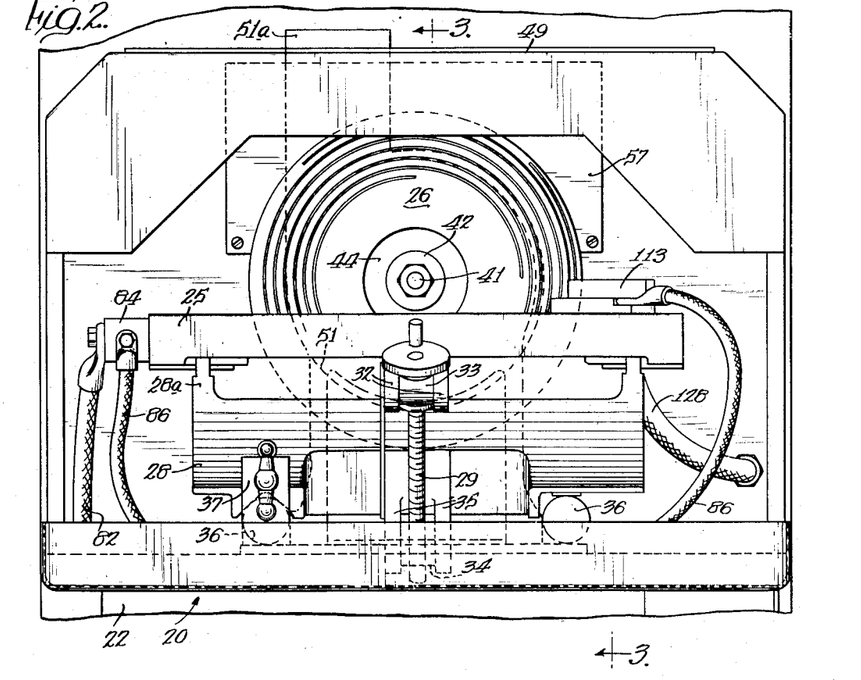
Fig. 2 is a fragmentary end elevation of the machine shown in Fig. 1.
Figure 3:
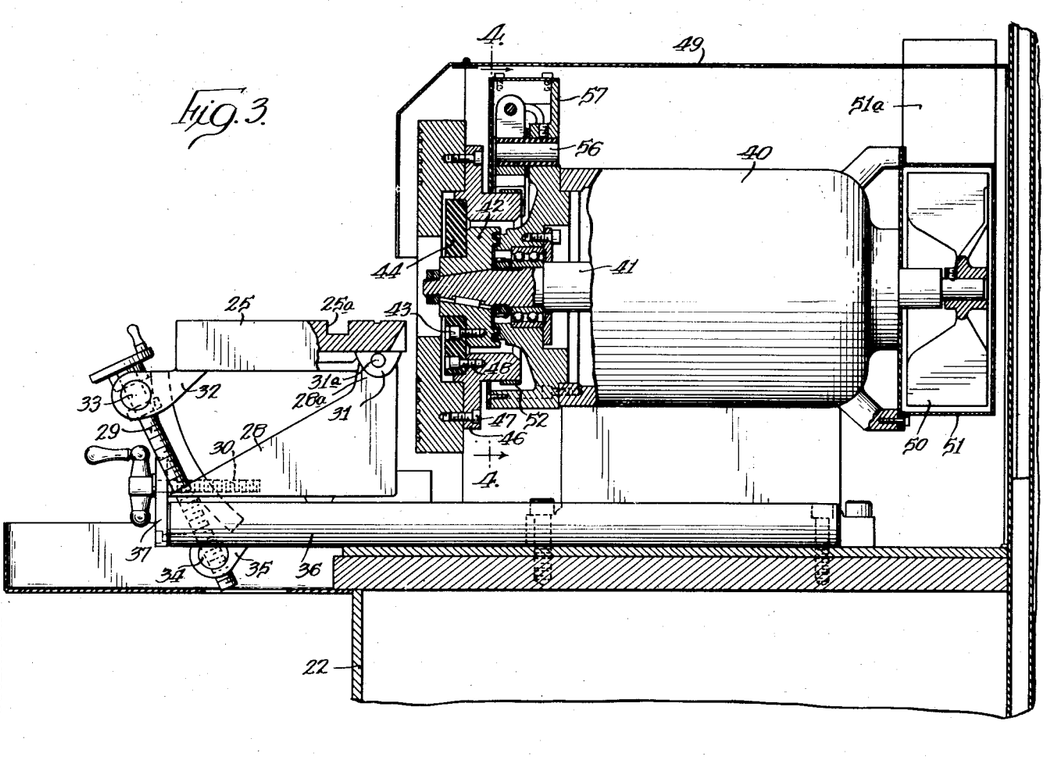
Fig. 3 is a side elevation partly in section of the portion of the machine illustrated in Fig. 2.

To provide for movement of the table 25 toward and away from the electrode-wheel, the saddle 28 is arranged to ride on a pair of longitudinal, parallel rods or ways 36 and movement thereof is effected by the position adjusting screw 30. The latter is rotatably supported in a bracket 37 and is threaded into a complementally-threaded opening formed in the saddle. Upon rotation of the screw, the saddle 28 and the table 25 mounted thereon are moved inwardly or outwardly with respect to the electrode-wheel 26.

An operator of the illustrative tool may wish to employ a protractor or other guiding device to assist him in positioning a workpiece resting on the table 25 with respect to the electrode-wheel 26. Thus, the table 25 is desirably provided with a groove or channel 25a for the accommodation of such a device.

For rotating the electrode-wheel the spark machining unit 24 includes an electric motor 40. The motor terminates at its forward end in a spindle 41 to which the electrode-wheel 26 is non-rotatively secured. Since the wheel 26 comprises one of the spark machining electrodes, the other being the workpiece itself, it is desirably insulated from the motor spindle. Thus, the wheel structure includes in addition to the wheel itself a mounting collar 42 which is adapted to be non-rotatively secured to the motor spindle 41. Fastened to the collar 42 as by screws 43 is a disc 44 formed of rigid insulating material. Interposed between the wheel 26 and the insulating disc 44 is an annular mounting ring or annular disk 46. The ring 46 is fixed to the replaceable electrode wheel 26, providing a large area of intimate interface engagement therewith, and to the insulating disc 44 as by machine screws 47 and 48.

During a spark machining operation of the type contemplated by the illustrative apparatus, some fumes may be produced, and in order to contribute to operator comfort they are desirably conducted away from the working area. Further, as a safety precaution, protection against accidental contact with the rapidly rotating electrode-wheel is also desirable. For these purposes, a cover 49 is provided and the motor 40 is equipped at its rear end with a fan 50. The fan 50 has a housing 51 about it and the cover 49 serves, in addition to its protective function, to direct air flow from the working area, about the motor, toward the fan housing 51. The fan housing is provided with an exhaust duct 51a which projects through the cover 49 at the back of the unit and if desired may be connected with the plant's main exhaust system.

Figure 4:
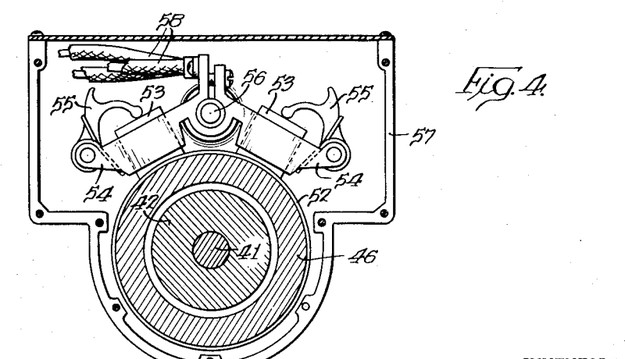
Fig. 4 is a vertical section taken substantially in the plane of line 4—4 in Fig. 3.

As previously noted the wheel 26 comprises one of the gap electrodes of the spark machining unit. Thus, means is provided for effecting an electrical connection therewith. As shown in Figs. 3 and 4 this means includes an electrode structure which permits relative rotation between its components. The electrode structure includes a slip ring 52 which is concentric and rigid with the annular mounting ring 46 for the wheel 26 and slip ring contactors or fixed electrodes 53 of a form similar to conventional motor brushes for cooperation with the slip ring 52. To provide a large contact area a pair of contact or brush elements 53 are provided which are mounted in a holder 54. The holder 54 includes pivoted spring biased fingers 55 which urge the contact elements 53 into engagement with the slip ring 52. Centrally thereof the holder 54 is of split collar form for the reception of an insulated mounting pin 56 by means of which it is supported within a protective housing 57 mounted on the motor 40. The contact member holder 54 is equipped with suitable terminals and conductors 58 by means of which it is included in the spark machining circuit. Preferably several spaced conductors 58 are used in order to minimize lead inductance.

Figure 5:
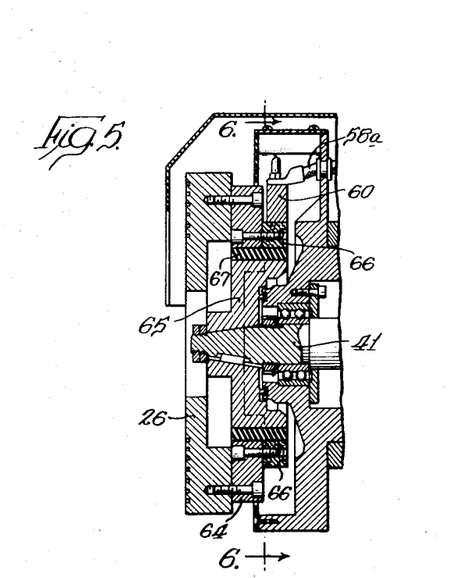
Fig. 5 is a fragmentary side elevation partly in section, similar to Fig. 3, but illustrative of an alternative form of rotary contact and electrode-wheel mounting structure.
Figure 6:
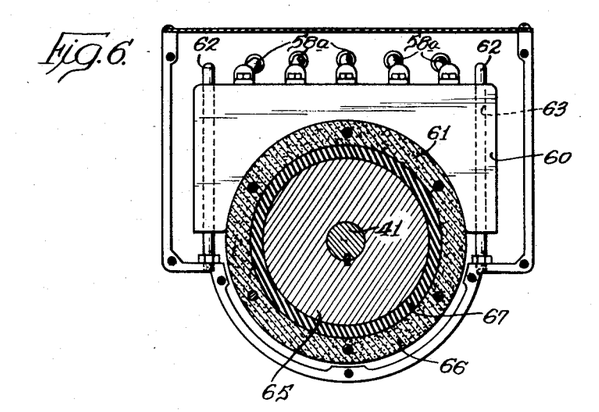
Fig. 6 is a vertical section taken substantially in the plane of line 6—6 in Fig. 5.

In Figs. 5 and 6 there is shown an alternative means for mounting the electrode-wheel 26 and for connecting it into the spark machining circuit. As there shown the fixed contact member comprises a single contact electrode 60. The electrode 60 is formed from a generally rectangular block of conducting material such as brass and is provided with a substantially semicircular notch 61. The contact electrode 60 is maintained in position within the protective housing 57 by guide pins 62 which are fixed to the housing and extend through guide holes 63 formed in the electrode.

In this form the electrode-wheel 26, which may be formed of ordinary grey cast iron, is supported upon a mounting disc 64, preferably formed of brass, which provides a large interface or contact area therewith. Interposed between the shaft 41 of the motor 40 and the disc 64 is a steel collar 65 and slip ring 66. The latter are separated by an annular insulator 67. Preferably the slip ring 66 is formed of a conducting bearing material to provide the least possible drag yet at the same time to provide the maximum contact area between it and the electrode 60 for current flow between the electrode-wheel 26 and the spark machining circuit. Such a conducting bearing material, for example, is commercially available under the trade name "Oilite." To minimize lead inductance, the line 58 for connecting the contact electrode 60 with the spark machining circuit is preferably formed of a number of conductors 58a each of which is connected in spaced relation along the electrode 60.

Figure 9:
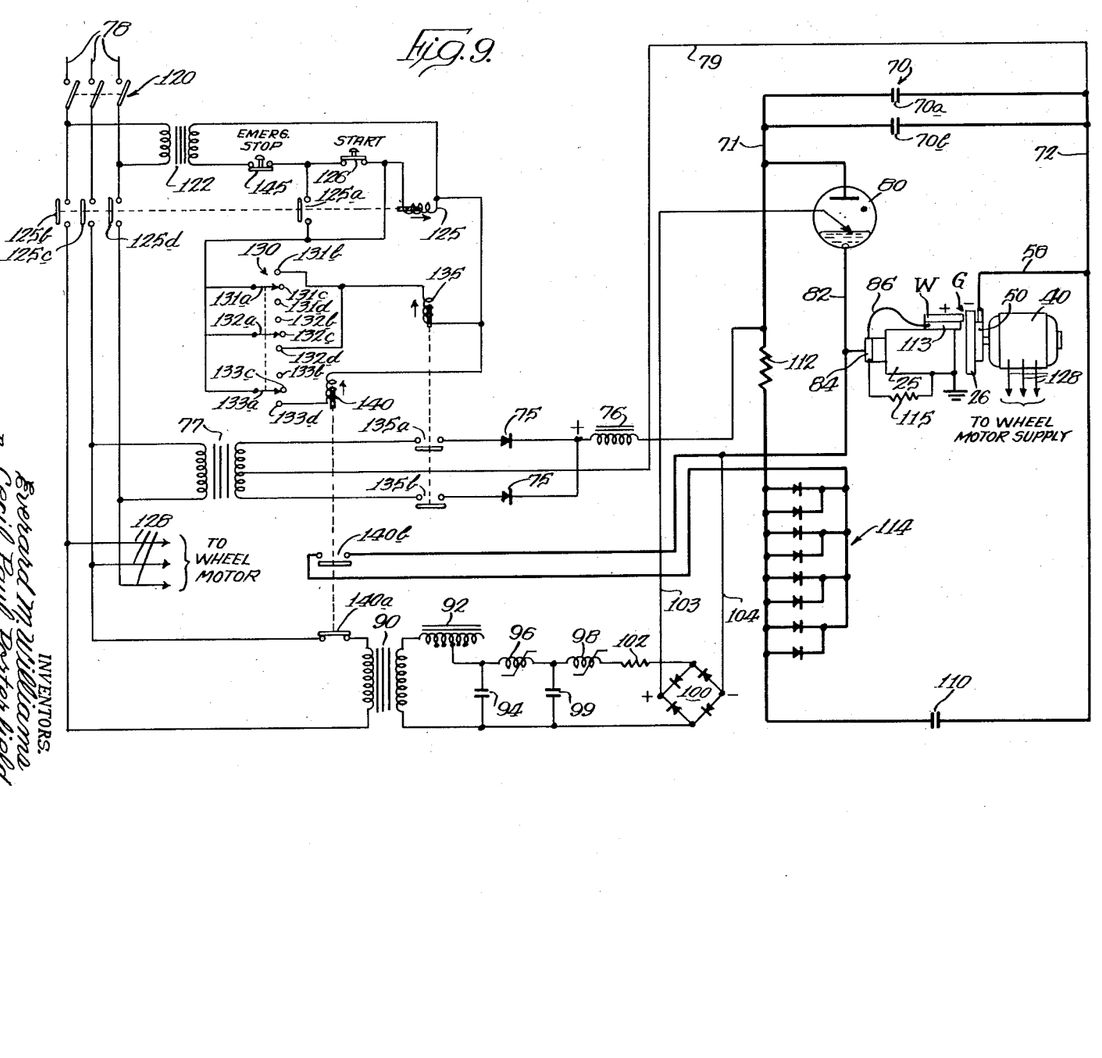
Fig. 9 is a schematic diagram of the circuitry included in the illustrative machine of the preceding figures.

Referring particularly to Fig. 9 of the drawings, there shown is a schematic circuit diagram illustrating the simplified circuitry included in the illustrative spark-cutting machine. It will be apparent from the description that while the spark machining circuits are discussed in connection with an off-hand tool sharpening machine, they readily permit of inclusion in other environments intended for performing internal as well as external machining operations. Adjacent the right-hand edge of the drawing there is diagrammatically indicated the cathodic electrode-wheel 26, which is mounted for rotation by the motor 40, in juxtaposition with the work table 25 upon which rests a workpiece W. The electrode-wheel is connected into the spark machining circuitry by way of the conductor 58 and its associated electrode structure.

A spark gap G is thus defined by the spacing between the juxtaposed surface portions of the conductive workpiece W and the electrode-wheel 26. When a sufficiently large positive voltage is applied to the workpiece W so that it acts as an anode with respect to the cathodic electrode-wheel, disruptive breakdown of the dielectric therebetween occurs. That is to say, an ionized path is briefly maintained across the gap G. The voltage required to initiate the discharge increases with increase in spark gap length. However, practical spark gap lengths are small, being usually on the order of thousandths of an inch in length. While the discharge peak current is desirably large, the discharge duration is usually less than a hundred microseconds and preferably very much less. As presently understood, the dislodging of particles from the conductive workiece by spark action is best explained in terms of electric field force produced by the spark-discharge current. This understanding is set forth in some detail in the copending application of Everard M. Williams, Serial No. 444,837 filed July 21, 1954, and which appears to be supported by laboratory observations. It has been concluded therefrom that the current density determines the amount of material dislodged per spark discharge, and that for a given amount of energy (product of current and duration) effectiveness is increased by increasing the current to time ratio. The total material removal is the cumulative effect of a number of spark discharges and hence the repetition rate is directly involved in actual practice.

In Fig. 9 there is shown combined circuitry for effecting high energy, short duration, spark discharges across the gap G, and for effecting relatively lower energy spark discharges at a relatively higher rate across the gap G. For these purposes the illustrative device includes a relatively large capacitive storage means together with means for controlling the discharge thereof across the gap G at a relatively low repetition rate, and it also includes means providing a substantially lower storage capacity together with means for effecting discharge thereof across the gap at a relatively high repetition rate, the same charging current supply being utilized for each capacitive storage means. As shown, the relatively large capacitive storage means is provided as indicated at 70 by a capacitance of approximately 300 microfarads. In this instance, this capacitance is achieved by the utilization of a pair of capacitors 70a and 70b connected in parallel between spark discharge mains 71 and 72. For charging the capacitive storage means 70 an alternating current charging circuit consisting basically of a full wave, single phase rectifier feeding a charging inductance is employed. The rectifier is indicated generally at 75 and is preferably of the center-tap selenium type intended for continuous duty. The output of the rectifier is applied to an inductance 76 in such manner that unidirectional potential is supplied to the conductor 71 of the spark machining mains. The rectifier 75 is supplied from the secondary of a transformer 77, the primary winding of which is connected to the alternating power supply for the machine as represented by the 3-wire line 78. To complete the charging circuit, the spark-machining main 72 is connected by conductor 79 back to the center-tap of the secondary of the transformer 77.

In order to control the discharge of the capacitive means 70 the illustrative device employs an ignitron 80. The ignitron 80 comprises a pool-cathode electron discharge device having therein means for initiating ionization so as to render the device conductive. The ignitron 80 has its plate connected to the conductor 71 and its cathode connected to the workpiece W. The latter connection is effected by way of a conductor 82 to an insulated terminal block 84 which is fixed with respect to the work table 25 and which serves as the terminus for a flexible conductor 86 which is connected to the workpiece W. From the other side of the gap G, the discharge path further includes the electrode-wheel 26 and the conductor 58 by means of which the wheel is connected to the conductor 72 of the spark discharge mains. After the capacitive storage means 70 is charged, in that space of time determined by the value of the inductance 76 and the particular capacitance of the storage means 70, the ignitron 80 is caused to become conductive and the capacitive storage means 70 discharges through the ignitron 80 and across the gap G. In this manner time spaced discharges of high energy are initiated.

Means is provided for relating the repetition rate of spark discharges from the capacitive storage means 70 across the gap G to the frequency of the alternating electrical power supply to the illustrative machine. More particularly, the ignitron 80 is continuously connected to a unidirectional periodic power source and the circuit is such that the ignitron is arranged to be made conducting so as to discharge the capacitive storage means across the gap G, and to again become non-conducting prior to the arrival of the next cycle from the power source. Stated in other words, at the beginning of a cycle from the periodic power source the ignitron is maintained non-conductive so that the capacitive storage means 70 is charged; the ignitron is then made conductive to effect discharge of the capacitive storage means; and then the ignitron is allowed sufficient time to deionize so as to return to its non-conductive condition prior to the beginning of the next cycle from the periodic power source.

In order to render the ignitron 80 conductive a keying circuit is employed in the instant device which includes a phase shifting and peaking network. The output of the keying circuit comprises pulses of sufficient energy to place the ignitron 80 in conducting condition, and these pulses are such that there is one positive pulse for each half cycle of the supply voltage so spaced with reference to the supply voltage that they occur approximately 20 electrical degrees, i. e., approximately 900 microseconds, before each source voltage zero or crossover. Further, these pulses should also be of short duration but of high energy.

As shown, the keying circuit includes a transformer 90 having its primary connected to the power source 78 and its secondary applied to a phase shifting and peaking network. The output of this network is fed to a bridge rectifier, and the output of the latter is applied between the ignitron's cathode and its igniter. More particularly, the phase shift network of the keying circuit includes an inductance or charging choke 92 and a capacitor 94. This may be termed the first stage of the keying circuit and is the pulse initiating and timing stage.

The second and third stages of the illustrative keying circuit consist of saturable inductances 96 and 98, a capacitor 99, a rectifier bridge 100 and a resistor 102. These two stages may be aptly termed pulse compression stages and are necessary to produce the aforementioned short, high energy pulses. It will be apparent that the rectifier bridge functions to make all the pulses positive for application to the ignitron. At this point it might be noted that the operation of the circuit may be entirely described by describing its operation for a single pulse. The fact that every other pulse is of opposite polarity causes no difficulty since all voltages are symmetrical about zero until application to the rectifier bridge 100.

The voltage which appears across the isolation transformer 90 is in exact time phase relation with the supply voltage. This voltage is impressed upon the series combination of the linear inductance 92 and the capacitor 94 whose values are chosen to cause "switching" of the saturable inductance 96 at the desired point before supply voltage zero. Preferably the charging inductance 92 is provided with a series of taps to permit compensation for various values of leakage inductance that may be encountered in the transformer 90. Initially the saturable inductance 96 presents a high impedance and the voltage across the capacitor 94 will also appear across it. But when the point that the saturable flux density of the inductance 96 is reached and it saturates, it presents an impedance which is largely the resistance of its winding. Since this is exceedingly small, effectively the capacitor 94 is short-circuited thereby permitting rapid discharge thereof into the succeeding stage of the circuit. For a given core and winding of the inductance 96 its saturation volt-time integral is fixed so that the point in the line voltage cycle at which the inductance 96 saturates may be varied simply by varying the voltage on the capacitor 94. Thus, if the voltage on the capacitor 94 is low, it will take a longer time for the inductance 96 to saturate than if it were high. Since, as has hereinbefore been noted, it is desirable that "switching" occur at a predetermined point before line voltage zero so as to initiate proper timed firing of the ignitron 80, it is necessary but to adjust the voltage time integral of the voltage across the capacitor 94. In order to avoid unwanted transients, however, it is desirable that the inductance 96 saturate when the current in the charging choke 92 has ceased to flow. Such a condition is also advantageous from another standpoint since when no current flows in the charging choke 92, then the capacitor 94 has maximum charge and thus maximum energy. It will be apparent that the initiation of a pulse in the keying circuit is denoted by the sharp drops or rises in voltage which can be seen to occur a substantial time prior to line voltage zero or crossover.

The second stage of the keying circuit is what may be termed a pulse compression stage. When the inductance 96 saturates, its impedance drops to a very low value causing the charge on the capacitor 94 to flow to the capacitor 99. Since the saturated inductance of the reactor 96 is very low, the oscillation frequency of the combination of the inductance 96, capacitance 94 and capacitance 99 is very high thus causing the voltage on the capacitor 99 to rise sharply. Thus to the pulse which is to progress down the keying circuit a much steeper rise is imparted. Initially the inductance 98 is unsaturated so that at the beginning of the charging of the capacitor 99 the inductance 98 does not load the capacitor 99. When the volt-time integral of the voltage on the capacitor 99 reaches the saturation value of the saturable inductance 98, however, the inductance 98 saturates. When this occurs its impedance drops to an exceedingly low value with the result that the capacitor 99 is discharged into the resistor 102 and the rectifier bridge 100. As a result there is an ever steeper pulse rise effected by the second stage, and further its duration is much reduced by the quick saturation of the saturable inductance 98.

The resistor 102 is inserted in the output stage of the keying circuit for the practical purpose of allowing the keying circuit to work into a wider range of igniter impedances without undesirable transients occurring. Because this type of keying circuit has been found, as a practical matter to be somewhat sensitive to load impedance this precaution of including the resistor 102 eliminates undesired keying. The resistor 102 may therefore be termed an isolation resistor and may be aptly said to provide impedance stabilization.

The output of the rectifier bridge is connected by leads 103 and 104 between the cathode and the igniter of the ignitron 80. That is to say, the negative terminal of the bridge 100 is connected by the leads 104 and 82 to the igniter cathode, and the positive terminal of the bridge is connected to the igniter of the ignitron 80 by means of the lead 103.

When an energy pulse is thus applied between the igniter and the cathode of the ignitron 80, the ignitron is rendered conductive and thus completes the discharge path for the capacitive storage means 70 to the gap G. It will be seen that there is a rapid drop in the capacitor storage means 70 voltage as discharge of the capacitor across the gap G is effected. As hereinbefore noted, the time for discharge of the capacitor storage means 70 is on the order of 70 microseconds maximum. Thereafter it will be appreciated there is substantially no voltage applied across the ignitron with the result that there is nothing to maintain ignitron ionization. Under these conditions deionization takes place within the ignitron and by allowing sufficient time to elapse the ignitron again becomes non-conductive. The ignitron 80 will remain in this non-conductive condition, then until the next positive pulse appears from the keying circuit between its igniter and cathode. This, for example, may be some 160 electrical degrees later, which amounts to something over 8300 microseconds later when translated into actual time, during which time the capacitive storage means 70 is again charged and conditioned for discharge for the next succeeding spark.

As hereinbefore noted, the present device also contemplates provision for effecting relatively lower energy spark-discharges across the gap G but at a substantially higher repetition rate for imparting a relatively fine finish to the work. For this purpose there is included in the illustrative device a circuit of modified relaxation type which includes capacitive storage means 110 which is adapted to be charged from the same alternating current resonant charging source. In this instance the AC resonant charging source functions as an inductive input, single section filter. The capacitive storage means 110 is resistance-capacitance charged through a resistor 112 from capacitive storage means 70. The capacitive storage means 110 is relatively small as compared to the capacitive storage means 70, and it is connected between the conductors 71 and 72 of the spark-machining mains. In the present instance the capacitive storage means 110 may be on the order of four microfarads, as compared to 300 microfarads for the means 70. In operation the capacitive storage means 110 is charged from the source 75, 76, and the effect of the capacitive storage means 70 thereon is to smooth any ripple appearing on the voltage applied to the relaxation circuit from the inductance 76 since the means 70 remains connected. The charge on the capacitor 110 would eventually approach the voltage of the source unless the spark gap G were maintained with a small enough spacing to assure spark-over or disruptive breakdown at or below the level of the source voltage. Upon spark-over the capacitive storage means 110 discharges through a discharge circuit which includes the main 71, the conductor 83, terminal block 84, lead 86, to the workpiece W and thence across the gap G. From the other side of the gap G the discharge path for the capacitive storage means 110 includes the electrode-wheel 26, the conductor 58, and the other spark-machining main 72. Due to inherent distributed inductance of the discharge circuit the discharge circuit tends to oscillate. While this inherent distributed inductance is desirably made as small as possible, the rate of current flow which upon discharge of the capacitive storage means 110 is of such large amplitude that momentarily stored inductive energy is by no means negligible. Thus, there is included in the discharge path a half wave rectifier 114, having a high current rating, to permit the discharge current to flow in the normal direction but to eliminate negative half cycles. As shown the half wave rectifier 114 is made up of four germanium rectifiers connected so that all eight cells thereof are in parallel. It will be apparent therefore that the rectifier 114 is effective to maintain the electrode to work current flow in the proper direction. This minimizes electrode erosion holding the same to what might be termed normal cathode phenomena. Additionally by it preventing a transient oscillatory current from flowing in the series circuit which includes the spark gap G and the capacitive storage means 110, the operation of the relaxation circuit is enhanced, and increased repetition rates are possible without initiating continuous conduction across the working spark gap G.

As shown the peak current in this circuit is of the order of 290 amperes while the average current in the circuit is of the order of two amperes, when a repetition rate as determined by the RC constant of the circuit is such as to effect a repetition rate of approximately 12 kilocycles per second. The average gap voltage is of the order of 70 volts.

Desirably the workpiece W is separated from the table 25 by a non-magnetic work holder 112 and the table 25 is connected into the spark-machining circuit by way of a current limiting resistor 114. As a practical matter in spark-machining operations with devices of the illustrative type it is highly desirable that workpieces be relatively unencumbered so as to permit ready removal thereof. For example, if the workpiece happens to be a replaceable tip tool or insert it may be necessary to frequently remove it for gauging purposes. The use of a work holder therefore permits the inclusion of the workpiece in the circuit by having the conductor 86 connected to the work holder with the workpiece held in place thereon. This arrangement eliminates the need for effecting a connection directly between the workpiece W and the conductor 86. Thus the workpiece is free to be moved without necessity for disconnecting the conductor 86. It will also be apparent that the table 25 must assume a potential substantially equal to that of the workpiece W which rests thereon so that there is substantially no gradient therebetween. Thus there will be eliminated any "machining" of the work holder 113, as might occur if a gradient did exist, and any danger of imparting an electrical shock to an operator using the device is eliminated. At the same time a lower resistance path from the discharge line 82 to the workpiece is desirable so that the majority of current flow will be by way of the conductor 86, work holder 113, and the workpiece W to the gap G. These are the functions of a current limiting resistor 115 which is interposed between the insulated terminal block 84 and the table 25. The fashioning of the work holder 113 of a nonmagnetic material such as brass serves to magnetically isolate the workpiece W from the table 25 and thereby prevent magnetic seizure from occurring between the workpiece W and the table 25 as might result from the high peak current flow through the workpiece.

The schematic circuit diagram shown in Fig. 9 also includes means for controlling the application, alternatively, of the high energy spark discharge from the capacitive storage means 70 and of the relatively lower energy spark discharge from the capacitive storage means 110 across the gap G. This control circuit includes a main switch 120 for the power supply line to the tool. When the switch 120 is closed the primary of a transformer 122 is energized so as to make available an appropriate supply for circuit controlling relays hereinafter to be described. The first of these relays is indicated at 125. The relay 125 includes a set of holding contacts 125a and three sets of power line contacts respectively indicated at 125b, 125c and 125d. Each of these contacts is normally open. When a push-button type "start" switch 126 is operated, the coil of the relay 125 is placed across the secondary of the transformer 122 and the relay 125 is energized, and each of the contacts 125a, 125b, 125c and 125d are closed. It will be appreciated, of course, that as soon as the "hold" conacts 125a are closed, the secondary circuit of the transformer 122 is completed through the coil 125 so as to maintain the relay energized.

With the closure of the contacts 125b, 125c, and 125d, power is supplied to the primary of the transformer 77 of the charging circuit for the capacitive storage means 70 and 110. Further, power is applied by way of conductors 128 to the motor 40.

A three-position selector switch is provided in the control circuit which in one position is operative to effect application of high energy discharge from the capacitive storage means 70 across the gap G; which in another position is effective to apply the relatively lower energy discharge from the capacitive storage means 110 across the gap G; which in its third position is effective to interrupt the application of spark discharge from either source. This switch is indicated generally at 130 and as shown is of the three-deck, gang type having its movable elements, respectively designated 131a, 132a, and 133a, mechanically connected so that they are movable together. As shown in Fig. 9, the fixed switch elements of each of the decks include three positions respectively designated 131b, 131c, and 131d; 132b, 132c and 132d; and 133b, 133c and 133d. Upon operation of the switch 130 so as to complete a circuit from the movable elements 131a, 132a and 133a through the fixed elements 131b, 132b, 133b, respectively, it will be seen that a circuit is completed through the "131" deck only, and the coil of a relay 135 is placed across the secondary of the transformer 122. The relay 135 is provided with a pair of normally open contacts 135a and 135b which are respectively included in each side of the secondary circuit of the transformer 77. Thus, when the relay 135 is energized, upon operation of the switch 130, the full-wave rectifier charging circuit is completed.

Upon operation of the switch 130 so that contact is made between the movable elements 131a, 132a and 133a, and the fixed contacts 131d, 132d and 133d, it will be seen that the relay 135 continues to be energized by way of contact between the deck elements 132a and 132d even though the deck elements 131c and 131d are open in this position of the switch. In this latter position of the switch 130, the contacts 135a and 135b of the relay 135 are maintained in closed condition, and therefore the capacitive storage means charging circuit is maintained operative.

Upon completion of the circuit between the switch elements 133a and 133d, the coil of a relay 140 is placed across the secondary circuit of the transformer 122. The relay 140 has a pair of normally closed contacts 140a and a pair of normally open contacts 140b. The normally open contacts as shown are included in the power supply to the primary of the transformer 90 of the ignitron keyer circuit so that upon energizing the relay 140 the power supply to the keyer circuit for the ignitron is interrupted. As a result no keying pulse is effected for application to the ignitron 80 and therefore the ignitron remains nonconducting. The relay contacts 140b are included in the discharge circuit of the relatively low energy capacitive storage means 110. Upon energizing the relay 140 this discharge circuit is completed.

The fixed switch elements 131c, 132c and 133c, as shown, remain unconnected and therefore when the switch is operated so that contact therewith is made respectively by the movable switch elements 131a, 132a and 133a, a standby or "ready" condition is defined.

For emergency purposes the secondary circuit of the transformer 122 is provided with a normally closed switch 145 in series with the secondary circuit of the transformer 122. This switch might be termed the "red button" stop switch, for it will be apparent that operating the same will serve to interrupt the secondary circuit momentarily and thus deenergize the relay 125 so that its contacts 125a are opened and the relay is no longer "held in." When the relay 125 is deenergized not only are its contacts 125a opened, but also its contacts 125b, 125c and 125d are opened. Thus the power supply not only in the relay energizing circuit but also in the charging circuit and in the supply circuit for the wheel motor is interrupted. Effectively therefore the entire operation of the machine is stopped.

As hereinbefore noted, it is essential to effective spark machining operation that the gap G be maintained between the electrode-wheel and the workpiece W. A fluid or semisolid, usually a hydrocarbon, having dielectric properties is usually maintained in the gap between the electrode-wheel and the workpiece and is necessary to obtain the short, high current sparks which have been found effective for practical machining rates and to avoid ineffective sparking or prolonged heating arcs which could occur in air. In addition the fluid or semisolid dielectric, which is necessarily self-restoring after each discharge, also entrains the small removed particles and helps carry them away. The illustrative embodiment of the present invention comprises an external or outside spark machining device. With such devices dielectric materials essential to the spark machining apparatus in liquid state are difficult to retain on the electrode-wheel. While continuous liquid feed systems and guards may be added, with liquids a spray is generated and at the spark cutting region, where maximum sight is desired, sight may be obscured not only by the spray but by ripples or waves of liquid which would tend to flow across the surface of the wheel. Furthermore, with liquids considerable splatter is experienced. Therefore, in the present device it is intended that a fluid dielectric in a semisolid state be employed so that the disadvantages of the liquid or vapor states are avoided. One material found particularly suitable for this purpose is a semisolid petrolatum which is a microcrystalline petroleum wax. This permits of application to the electrode-wheel simply by wiping it across the face of the rotating electrode-wheel. It has been found that only a small amount of this material is required to adequately film the electrode-wheel surface. Due to the normally semisolid condition of the wax, the electrode-wheel does not have to be heated in order to apply the wax nor does the wax run off the wheel in operation.

The use of dielectric material of this sort is disclosed in the copending application of Cecil Paul Porterfield, Serial Number 531,327, filed August 30, 1955, and assigned to the same assignee as the present application.

In carrying out the present invention an improved construction of the electrode-tool or wheel is provided. As shown in Figs. 7 and 8, the electrode-wheel 26 of the illustrative device is especially formed to assure a good supply of semisolid dielectric in the gap G. More particularly, the electrode-wheel 26 has provided in the face thereof grooves 150 which are in the form of interlaced Archimedean spirals. As shown each extends for approximately 1⅝ revolutions, and is approximately 1/16 inch in width and depth. The illustrative wheel includes four of such spiral grooves respectively designated 150a, 150b, 150c and 150d, having a ¼ inch pitch and a one-inch lead. It will be appreciated of course that a single spiral having a ¼ inch pitch and a ¼ inch lead may also be utilized with equal effectiveness. Desirably the pitch and lead of the grooves should be chosen taking rotational speed of the electrode-wheel into consideration. When the semisolid dielectric is applied to the face of the wheel there is built up a considerable concentrate thereof in the spiral grooves. With each revolution of the wheel these troughs of dielectric are wiped across the face of the workpiece being machined. Thus, the dislodged particles of the material of the workpiece are removed from the gap vicinity and dielectric maintenance in the spark-gap is assured.

In the operation of the illustrative device there is one precaution that might be noted. The electrode-wheel 26 should be rotated at a speed which is non-synchronous with respect to the spark repetition rate. The purpose of this is to insure against consecutive spark-discharges occurring at the same place on the wheel surface. If this should occur it is possible for the wheel surface to become pitted or the dielectric to be removed at such a point of repeated spark discharge. Both of these would adversely affect spark machining of a workpiece. It will be apparent, however, that the use of any conventional form of non-synchronous motor for driving the electrode-wheel satisfies this precaution since in the present spark machining device the spark repetition rate is related to the source frequency.

We claim as our invention:

1. For use with an apparatus for performing a spark machining operation on a workpiece including an electrical circuit for applying to the workpiece short time-spaced spark-discharges and further including a motor and means for supporting the workpiece with respect to said motor; the combination comprising an electrode wheel of conducting material having in the face thereof adapted for disposition in juxtaposed relation to the workpiece a plurality of similarly pitched interlaced spiral grooves for the reception of semisolid dielectric material therein when the dielectric material is applied to said wheel face, an electrically conducting mounting disk detachably supporting said wheel and having intimate interface engagement therewith, means for non-rotatively mounting said wheel disk in insulated non-rotative relation upon said motor for rotation thereby, and means connecting said wheel into the spark machining circuit of the apparatus, said last mentioned means including said disk, a slip ring of electrically conductive bearing material fixed in coaxial relation to said wheel upon said disk and electrically connected thereto, and further including a fixed contactor engaging said slip ring and a multiple conductor line connected to said fixed contactor for connecting the same into the spark machining circuit.

2. For use with an apparatus for performing a spark machining operation upon a workpiece including an electrical circuit for the application thereto of short time-spaced spark-discharges and including a motor and means for supporting the workpiece with respect to the motor; the combination electrode comprising a replaceable electrode wheel of electrically conducting material, a mounting disk of electrically conducting material having intimate interface engagement with said wheel and detachably connected thereto, means for non-rotatively mounting said wheel disk in insulated relation upon the motor for rotation thereby, and means for connecting said wheel into the spark machining circuit of the apparatus, said last mentioned means including a slip ring of electrically conductive bearing material fixed in coaxial relation to said wheel upon said mounting disk and electrically connected thereto by way of intimate interface engagement with said disk, said last mentioned means also including a fixed contactor concentrically engaging said slip ring and a multiple conductor line connected to said fixed contactor for connecting the same into the spark machining circuit, said fixed contactor comprising a generally rectangular block of electrically conductive material having a substantially semicircular notch therein of a radius corresponding to that of said slip ring for direct bearing engagement therewith.

References Cited in the file of this patent

UNITED STATES PATENTS

| | | |
|---|---|---|
| 2,147,472 | Ulrey | Feb. 14, 1939 |
| 2,179,105 | Sidney | Nov. 7, 1939 |
| 2,235,385 | Rava | Mar. 18, 1941 |
| 2,295,293 | Rogers | Sept. 8, 1942 |
| 2,526,423 | Rudorff | Oct. 17, 1950 |
| 2,719,902 | Flynn | Oct. 4, 1955 |

FOREIGN PATENTS

| | | |
|---|---|---|
| 420,100 | Great Britain | Nov. 26, 1934 |
| 519,353 | Great Britain | Mar. 21, 1940 |
| 637,793 | Great Britain | May 24, 1950 |
| 1,048,972 | France | Aug. 12, 1953 |
| 1,108,192 | France | Aug. 24, 1955 |